3,526,642
2-OXA-5β-CYANOPREGNANE DERIVATIVES
Seymour D. Levine, North Brunswick, N.J., assignor to
E. R. Squibb & Sons, Inc., New York, N.Y., a corporation of Delaware
No Drawing. Filed June 19, 1968, Ser. No. 738,091
Int. Cl. C07d 7/28
U.S. Cl. 260—343.2    5 Claims

ABSTRACT OF THE DISCLOSURE

This disclosure relates to pregnanes having an oxygen atom in the 2-position and a cyano radical at the 5-position. These compounds possess anti-androgenic activity.

---

This invention relates to pregnanes having the following formula:

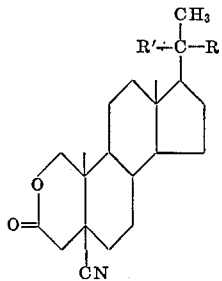

wherein R is hydrogen, R' is hydroxy, acyloxy or trifluoroacetoxy and together R and R' are oxo (O=), wherein the acyl radical is derived from a carboxylic acid, preferably the acyl radical of a hydrocarbon carboxylic acid of less than thirteen carbon atoms, as exemplified by the alkanoic acids (e.g., acetic, propionic, butyric, enanthic and lauric acid), the alkenoic acids, the monocyclic aryl carboxylic acids (e.g., benzoic and m-toluic acid), the monocyclic aryl lower alkanoic acids (e.g., phenylacetic and β-phenylpropionic acid), the cycloalkanecarboxylic acids and the cycloalkenecarboxylic acids.

As anti-androgens, the final products of this invention have been found to be useful in veterinary medicine. Male swine, the meat of which is usually rendered unpalatable by a characteristic odor developed by the mature animal which permeates the meat, may be treated with the final products of this invention in order to suppress the formation of the odor and hence render the meat more palatable. Likewise the caponizing of male chickens may be achieved without resort to castration by means of administration of the final products of this invention. For these purposes, they may be administered orally at a dosage of about 10 to 200 mg./kg. of body weight daily, or parenterally at a dosage of about 2 to 60 mg./kg. of body weight daily.

The end products of this invention may be prepared utilizing either A-norprogesterone or 20β-hydroxy-A-norpregn-3-en-2-one as starting materials. When utilizing A-norprogesterone as the starting material, it has been found that this material can be selectively reduced to 20β-hydroxy-A-norpregn-3-en-2-one by utilizing sodium borohydride or potassium borohydride as the reducing agent at 0° C. These reducing agents selectively reduce the carbonyl at the 20-position of A-norprogesterone without affecting the oxygen atom at the 2-position.

The reduced product is then reacted with potassium cyanide to form a new intermediate of the present invention, 5β-cyano-20β-hydroxy-A-norpregnane-2-one, which has the formula:

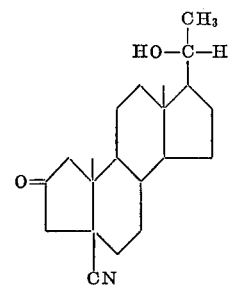

This new intermediate can then be acylated by reacting it with the desired acid anhydride in the presence of an organic base, such as pyridine or it can be subjected to a Baeyer-Villiger reaction to form the new 2-oxa compounds of this invention. Thus, if 5β-cyano-20β-hydroxy-A-norpregnane-2-one is treated with a peracid, such as peroxytrifluoroacetic acid, the corresponding 2-oxa-5β-cyano-20β-trifluoroacetoxypregnane-3-one is obtained. If, however, the acyloxy derivative is utilized, the product obtained will be the corresponding 2-oxa-5β-cyano-20β-acyloxypregnane-3-one. Hydrolysis of either the acyloxy or trifluoroacetoxy derivatives of this invention will yield the corresponding 20-hydroxy-2-oxa compounds of this invention. The hydrolysis may be carried out by known procedures, such as by reacting the acyloxy or trifluoroacetoxy derivative with alkali metal hydroxides, e.g., sodium hydroxide or potassium hydroxide.

The hydrolyzed product, 2-oxa-5β-cyano-20β-hydroxypregnane-3-one, can then be oxidized with Jones reagent (chromium trioxide-sulfuric acid) to yield another end product of this invention, 2-oxa-5β-cyanopregnane-3,20-dione.

The following examples illustrate the invention (all temperatures are in degrees centigrade).

EXAMPLE 1

20β-hydroxy-A-norpregn-3-en-2-one

A solution of 2.0 g. of A-norprogesterone in 200 ml. of methanol is treated at 0° with 380 mg. of sodium borohydride and stirred at this temperature for one hour. Acetic acid (3 drops) is added and the solution evaporated to dryness, diluted with water and extracted with chloroform. The chloroform extracts are washed with 8% salt solution, dried and evaporated. The residue is crystallized from chloroform-isopropyl ether to give 1.68 g. of 20β-hydroxy-A-norpregn-3-en-2-one, M.P. 210–212°.

EXAMPLE 2

5β-cyano-20β-hydroxy-A-norpregnane-2-one

A mixture of 300 mg. of 20β-hydroxy-A-norpregn-3-en-2-one, 130 mg. of potassium cyanide and 80 mg. of ammonium chloride in 1 ml. of water and 5 ml. of methanol is refluxed for 70 hours. The mixture is concentrated, diluted with water, and extracted with chloroform. The chloroform extracts are washed with 8% salt solution, dried and evaporated. Plate chromatography of the residue on silica gel, using ethyl acetate-chloroform (3:2) as the developing solvent and elution of the most polar band with ethyl acetate gives a residue which is crystallized from ether-isopropyl ether to afford 93 mg. of 5β-cyano-20β-hydroxy-A-norpregnane-2-one, M.P. 188–189°. The analytical sample is prepared by recrystallization from chloroform-isopropyl ether, M.P. 189–190°; [α]$_D$ −83° (EtOH); λ$^{KBr}$ 2.82, 4.49 and 5.74μ;

$\tau^{TMS}_{CDCl_3}$ 9.22(s., 18-Me), 8.87(d, J=6 c./s., 21-Me), 8.79 (s., 20β-OH), 8.62(s., 19-Me), 7.55(s., 3-CH$_2$) and 6.29(m., 20α-H)

*Analysis.*—Calc'd for C$_{21}$H$_{31}$O$_2$N (329.47), (percent): C, 76.55; H.9.48; N, 4.25. Found, (percent): C, 76.30; H, 9.27; N, 4.17.

EXAMPLE 3

5β-cyano-20β-actoxy-A-norpregnane-2-one

A solution of 749 mg. of 5β-cyano-20β-hydroxy-A-norpregnane-2-one in 0.75 ml. of acetic anhydride and 1.5 ml. of pyridine is left at room temperature overnight. The mixture is diluted with water and extracted with chloroform. The chloroform extracts are washed with 8% salt solution, dried and evaporated. The residue is crystallized from chloroform-isopropyl ether to give 610 mg. of 5β-cyano-20β-acetoxy-A-norpregnane-2-one, M.P. 159–160°;

$\tau^{TMS}_{CDCl_3}$ 9.33 (s., 18-Me), 8.86 (d, J=6 c./s., 21-Me) 8.63 (19-Me), 8.00 (s., 20β-acetate) and 7.64 (s.,3-CH$_2$)

EXAMPLE 4

2-oxa-5β-cyano-20β-trifluoroacetoxypregnane-3-one

A mixture of 400 mg. of 5β-cyano-20β-hydroxy-A-norpregnane-2-one and 300 mg. of disodium hydrogen phosphate in 10 ml. of methylene chloride is treated with an excess of peroxytrifluoroacetic acid and stirred at room temperature for 5 days. The mixture is diluted with chloroform and washed with 5% potassium iodide solution, 10% sodium bisulfite solution, dried and evaporated to dryness. Plate chromatography of the residue on silica gel using chlorofrom as the developing solvent and elution of the most polar band with ethyl acetate gives a residue which is crystallized with ether-isopropyl ether to yield 138 mg. of 2-oxa-5β-cyano-20β-trifluoroacetoxypregnane-3-one, M.P. 162–163°. The analytical sample is prepared by recrystallization from ether-isopropyl ether, M.P. 166.5–167.5°; [α]$_D$+65° (EtOH); λ$^{KBr}$ 4.44, 5.69 and 5.73μ;

$\tau^{TMS}_{CDCl_3}$ 9.33 (s., 18-Me), 8.83 (s., 19-Me), 8.70 (d, J=6 c./s., 21-Me), 7.05 (s., 4-CH$_2$), 5.77 (s., 1-CH$_2$) and 4.97 (m., 20α-H)

*Analysis.*—Calc'd for C$_{23}$H$_{30}$F$_3$NO$_4$ (441.50) (percent): C, 62.57; H, 6.85; N, 3.18; F, 12.91. Found, (percent): C, 62.49; H, 7.10; N, 3.30; F, 13.26.

EXAMPLE 5

2-oxa-5β-cyano-20β-acetoxypregnane-3-one

Following the procedure in Example 4 but substituting 5β-cyano-20β-acetoxy-A-norpregnane-2-one for 5β-cyano-20β-hydroxy-A-norpregnane-2-one, there is obtained the title compound.

EXAMPLE 6

2-oxa-5β-cyano-20β-hydroxypregnane-3-one (a) A solution of 100 mg. of 2-oxa-5β-cyano-20β-trifluoroacetoxypregnane-3-one in 8 ml. of dioxane and 13 ml. of 5% sodium hydroxide solution is stirred at room temperature for five hours, acidified with acetic acid and concentrated. Water is added and the aqueous phase is extracted with chloroform. The extracts are washed with 8% salt solution, dried and evaporated to give 2-oxa-5β-cyano-20β-hydroxypregnane-3-one:

$\tau^{TMS}_{CDCl_3}$ 9.34 (s., 18-Me), 8.84 (d, J=6 c./s., 21-Me), 8.82 (s., 19-Me) and 6.29 (m., 20α-H)

(b) Following the procedure in Example 6a, but substituting 2-oxa-5β-cyano-20β-acetoxypregnane-3-one for 2-oxa-5β-cyano-20β-trifluoroacetoxypregnane-3-one, there is obtained the title compound.

EXAMPLE 7

2-oxa-5β-cyanopregnane-3,20-dione

A solution of 180 mg. of 2-oxa-5β-cyano-20β-hydroxypregnane-3-one in 6 ml. of acetone is treated with a slight excess of chromium trioxide-sulfuric acid. Methanol is added and the mixture is filtered through Hy-flo and evaporated. The residue is plate chromatographed on silica gen using chloroform as the developing solvent Elution of the major band with ethyl acetate, evaporation and crystallization from acetone-isopropyl gives 70 mg. of 2 - oxa - 5β-cyanopregnane-2,20-dione). M.P. 150.5–151.5°. The analytical sample is prepared by recrystallization from acetone-isopropyle ether, M.P. 151.5–152°; [α]$_D$+113° (EtOH);

$\tau^{TMS}_{CDCl_3}$ 9.35 (s., 18-Me), 8.82 (s., 19-Me), 7.88 (s., 21-Me), 7.03 (s., 4-CH$_2$) and 5.72 (s., 1-CH$_2$)

*Analysis.*—Calc'd for C$_{21}$H$_{29}$NO$_3$ (343.45), (percent): C, 73.43; H, 8.51; N, 4.08. Found, (percent): C, 73.18; H, 8.73; N, 4.17.

The invention may be variously otherwise embodied within the scope of the appended claims.

What is claimed is:
1. A compound having the formula:

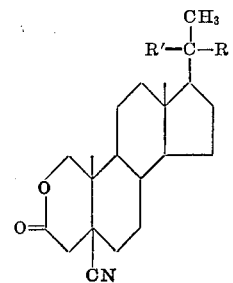

wherein R is hydrogen; R' is hydroxy, acyloxy or trifluoroacetoxy, and together R and R' are oxo (O=), wherein the acyl is a hydrocarbon carboxylic acid and when non-aromatic contains less than thirteen carbon atoms and when aromatic contains less than ten carbon atoms.

2. A compound in accordance with claim 1 having the name 2-oxa-5β-cyano-20β-trifluoroacetoxypregnane-3-one.

3. A compound in accordance with claim 1 having the name 2-oxa-5β-cyano-20β-acetoxypregnane-3-one.

4. A compound in accordance with claim 1 having the name 2-oxa-5β-cyano-20β-hydroxypregnane-3-one.

5. A compound in accordance with claim 1 having the name 2-oxa-5-cyanopregnane-3,20-dione.

References Cited

UNITED STATES PATENTS 3,246,014   4/1966   Jung et al. _____ 260—343.2

FOREIGN PATENTS 1,476,631   3/1967   France.

HENRY R. JILES, Primary Examiner

J. M. FORD, Assistant Examiner

U.S. Cl. X.R.

260—999, 464